(12) United States Patent
Luo et al.

(10) Patent No.: US 12,710,313 B2
(45) Date of Patent: Aug. 18, 2026

(54) SYSTEM AND METHOD FOR IMAGING WITH A PIXELATED METASURFACE WAVEPLATE AND A UNIFORM POLARIZER

(71) Applicant: CORNING INCORPORATED, Corning, NY (US)

(72) Inventors: Rui Luo, Fremont, CA (US); Michael John Yadlowsky, Sunnyvale, CA (US)

(73) Assignee: Corning Incorporated, Corning, NY (US)

( * ) Notice: Subject to any disclaimer, the term of this patent is extended or adjusted under 35 U.S.C. 154(b) by 205 days.

(21) Appl. No.: 18/695,391

(22) PCT Filed: Sep. 9, 2022

(86) PCT No.: PCT/US2022/043013
§ 371 (c)(1),
(2) Date: Mar. 26, 2024

(87) PCT Pub. No.: WO2023/055549
PCT Pub. Date: Apr. 6, 2023

(65) Prior Publication Data

US 2025/0146873 A1 May 8, 2025

Related U.S. Application Data

(60) Provisional application No. 63/249,060, filed on Sep. 28, 2021.

(51) Int. Cl.
*G01J 4/04* (2006.01)
*G02B 3/00* (2006.01)
*G02B 5/30* (2006.01)

(52) U.S. Cl.
CPC .............. *G01J 4/04* (2013.01); *G02B 3/0037* (2013.01); *G02B 5/3058* (2013.01); *G02B 5/3083* (2013.01)

(58) Field of Classification Search
CPC ....... G01J 4/04; G02B 3/0037; G02B 5/3058; G02B 5/3083
See application file for complete search history.

(56) References Cited

U.S. PATENT DOCUMENTS 5,552,912 A * 9/1996 Sharp .................. G02F 1/13471 349/171
6,563,582 B1 5/2003 Chun
(Continued)

FOREIGN PATENT DOCUMENTS

CN 108088564 A 5/2018
CN 111856770 A 10/2020
(Continued)

OTHER PUBLICATIONS

"Corning Valor® Glass is a revolutionary primary pharmaceutical glass package", Retrieved from: https://www.corning.com/worldwide/en/products/pharmaceutical-technologies/valor-glass.html, 2023, 5 pages.

(Continued)

*Primary Examiner* — Georgia Y Epps
*Assistant Examiner* — Don J Williams
(74) *Attorney, Agent, or Firm* — Svetlana Z. Short

(57) ABSTRACT

A polarization camera that includes a pixelated waveplate positioned to receive light. The pixelated waveplate includes an array of super-pixels comprising birefringent structures. Each super-pixel comprises a first at least one sub-pixel comprising a quarter-wave plate and a second at least one sub-pixel comprising a half-wave plate. A non-pixelated polarizer receives light from the pixelated waveplate. A detector detects light received from the polarizer.

19 Claims, 6 Drawing Sheets

(56) References Cited

U.S. PATENT DOCUMENTS

| | | | | |
|---|---|---|---|---|
| 2020/0064662 | A1* | 2/2020 | Pau | G02F 1/0136 |
| 2021/0003512 | A1 | 1/2021 | Sosman et al. | |
| 2021/0190593 | A1 | 6/2021 | Yao et al. | |
| 2021/0405086 | A1* | 12/2021 | te Velthuis | G01N 21/21 |

FOREIGN PATENT DOCUMENTS

| | | | |
|---|---|---|---|
| JP | 2018-200401 | A | 12/2018 |
| WO | 2019/125179 | A1 | 6/2019 |

OTHER PUBLICATIONS

"Profile Parameters from ISO 4287", Retrieved from: https://guide.digitalsurf.com/en/guide-iso-4287-parameters.html, 2023, 4 pages.

Watson et al., "New Vial Technology Shows Promise for Manufacturing Productivity", PDA Letter, 2020, 13 pages.

Gecevicius Mindaugas et al., "Polarization Sensitive Camera By Femtosecond Laser Nanostructuring", Optics Letters, vol. 38, No. 20, Oct. 9, 2013, pp. 4096, XP093008214, Us ISSN: 0146-9592, DOI: 10.1364/OL.38.004096.

International Search Report and Written Opinion of the International Searching Authority; PCT/US22/43013; mailed on Jan. 4, 2022, 15 pages; European Patent Office.

Ohfuchi Takafumi et al., "Polarization Imaging Camera With A Waveplate Array Fabricated With A Femtosecond Laser Inside Silica Glass", Optics Express, vol. 25, No. 20, Sep. 19, 2017, pp. 23738, Xp093007762, Doi: 10.1364/Oe.25.023738.

* cited by examiner 211
213
215
218
216
212
208
206
204
220
130

211
213
215
218
216
212
208
206
204
210
130

211
213
215
218
216
212
208
206
204
260
130

211
213
215
218
216
212
208
206
204
240
130

SYSTEM AND METHOD FOR IMAGING WITH A PIXELATED METASURFACE WAVEPLATE AND A UNIFORM POLARIZER

CROSS-REFERENCE TO RELATED APPLICATIONS

This application claims the benefit of priority under 35 U.S.C. § 371 of International Application No. PCT/US2022/043013, filed on Sep. 9, 2022, which claims the benefit of priority under 35 U.S.C. § 119 of U.S. Provisional Application No. 63/249,060 filed Sep. 28, 2021, the content of which is incorporated herein by reference in its entirety.

FIELD

The present specification generally relates to systems and methods for imaging light, and more particularly, systems and methods for imaging light with a pixelated metasurface waveplate and a uniform, non-pixelated polarizer.

TECHNICAL BACKGROUND

Cameras measure the optical intensity within a spectral region or regions of interest. Polarimetry is the measurement of the polarization or the vector nature of light and can provide information that is not available from intensity alone. To create an image with polarization information light is filtered or split from a scene into a representative set of constituent polarization states. The polarization state of light in a particular region can be defined by its Stokes parameters, which represent time-averaged projections into a standardized set of polarization states. Stokes parameters are frequently used as the basis states for polarization imaging.

Implementations of polarization imaging include division of time, amplitude, aperture, and focal plane, which are defined by how image light of different polarizations is separated and sent to an image sensor. Division of time uses switchable polarization optics to take a series of polarized images which are detected at different times. Division of amplitude uses polarization optics to split imaging light to multiple image sensors. Division of aperture uses an array of, often bulky, polarization optics to spatially separate polarizations. These methods require extra switches, optics, and/or sensors that increase complexity and cost. Division of focal plane splits imaging light with miniaturized polarization optics at the focal plane or image sensor, and records images representing different polarizations with different parts of the same image sensor.

Traditional polarization imaging approaches need pixelated polarizers that rely on complicated fabrication processes and sometimes have low performance. Current full-Stokes image sensors using pixelated polarizers also require precise pixel-to-pixel registration between the waveplate, the polarizer, and the detector. This results in a stringent requirement for the alignment precision, which becomes increasingly difficult for modern image sensors with smaller and smaller pixels.

Therefore, there is a need for improved image sensing systems and methods. In particular, it is desirable to reduce difficulty in manufacturing components of an image sensing system, increase reliability, and otherwise improve upon image processing for polarization.

SUMMARY

A first aspect of the present disclosure includes a polarization camera including a microlens array. The polarization camera further includes a pixelated waveplate positioned to receive light passing through the microlens array; the pixelated waveplate includes an array of super-pixels comprising birefringent structures. Each super-pixel includes a first at least one sub-pixel comprising a quarter-wave plate (QWP) and a second at least one sub-pixel comprising a half-wave plate (HWP). The polarization camera further includes a non-pixelated polarizer to receive light from the pixelated waveplate, and a detector configured to detect light received from the non-pixelated polarizer.

A second aspect of the present disclosure includes the camera of the above aspect, with a pixelated waveplate that includes a metamaterial.

A third aspect of the present disclosure includes the camera of the any of the above aspects, wherein the metamaterial includes high-index sub-wavelength structures defining structural birefringence.

A fourth aspect of the present disclosure includes the camera of the any of the above aspects, further including a uniform waveplate disposed between the microlens array and the pixelated waveplate.

A fifth aspect of the present disclosure includes the camera of the fourth aspect, wherein the uniform waveplate applies a uniform birefringence to the light received by the pixelated waveplate.

A sixth aspect of the present disclosure includes the camera of the any of the above aspects, wherein each super-pixel further includes a third at least one sub-pixel comprising a zero waveplate that has no net birefringence such that incident polarization states of the received light is not altered.

A seventh aspect of the present disclosure includes the camera of the any of the above aspects, wherein each super-pixel comprises four sub-pixels and the waveplate sub-pixels are (1) ZWP, (2) HWP with fast axis oriented at 22.5 degrees relative to the polarizer transmission axis, (3) a QWP with fast axis oriented at 45 degrees relative to the polarizer transmission axis, and (4) a HWP with fast axis oriented at 45 or 135 degrees relative to the polarizer transmission axis. The camera further comprises a computing device coupled to the detector, wherein the computing device is configured to determine Stokes parameters for a first super-pixel of the array of super-pixels according to the following equations: $S_0=I_{A'}+I_{D'}$, $S_1=I_{A'}-I_{D'}$, $S_2=2I_{B'}-I_{A'}-I_{D'}$, $S_3=2I_{C'}-I_{A'}-I_{D'}$, wherein $I_{A'}$ comprises an intensity at the third at least one sub-pixel, $I_{C'}$ comprises an intensity at a first of the first at least one sub-pixel, $I_{B'}$ comprises an intensity at a first of the second at least one sub-pixel, $I_{D'}$ comprises an intensity at a second of the second at least one sub-pixel, $S_0$ comprises a Stokes parameter for a first polarization coordinate, $S_1$ comprises a Stokes parameter for a second polarization coordinate, $S_2$ comprises a Stokes parameter for a third polarization coordinate, and $S_3$ is a Stokes parameter for a fourth polarization coordinate.

An eighth aspect of the present disclosure includes the camera of the any of the above aspects, wherein each super-pixel comprises six sub-pixels, wherein the sub-pixel waveplates are (1) ZWP, (2) HWP with fast axis oriented at 22.5 degrees relative to the polarizer transmission axis, (3) a QWP with fast axis oriented at 45 degrees relative to the polarizer transmission axis, (4) a HWP with fast axis oriented at 67.5 degrees relative to the polarizer transmission axis, (5) a QWP with fast axis oriented at 135 degrees relative to the polarizer transmission axis, and (6) a HWP with fast axis oriented at 45 or 135 degrees relative to the polarizer transmission axis, further comprising a computing device coupled to the detector, wherein the computing device is configured to determine Stokes parameters for a first super-pixel of the array of super-pixels according to the following equations: $S_0=I_A+I_F$, $S_1=I_A-I_F$, $S_2=I_B-I_D$, $S_3=I_C-I_E$, wherein $I_A$ comprises an intensity at the third at least one sub-pixel, $I_B$ comprises an intensity at a first of the first at least one sub-pixel, $I_C$ comprises an intensity at a second of the first at least one sub-pixel, $I_D$ comprises an intensity at a first of the second at least one sub-pixel, $I_E$ comprises an intensity at a second of the second at least one sub-pixel, $I_F$ comprises an intensity at a third of the second at least one sub-pixel, $S_0$ comprises a Stokes parameter for a first polarization coordinate, $S_1$ comprises a Stokes parameter for a second polarization coordinate, $S_2$ comprises a Stokes parameter for a third polarization coordinate, and $S_3$ is a Stokes parameter for a fourth polarization coordinate.

A ninth aspect of the present disclosure includes the camera of the any of the above aspects, wherein the non-pixelated polarizer comprises a non-pixelated metal grid.

A tenth aspect of the present disclosure includes the camera of the any of the above aspects, further including a color filter disposed between at least one of the microlens array and the pixelated waveplate, the pixelated waveplate and the non-pixelated polarizer, or the non-pixelated polarizer and the detector.

An eleventh aspect of the present disclosure includes the camera of the any of the above aspects, wherein the ZWP, QWP and the HWP are achromatic within a predetermined bandwidth of the color filter.

A twelfth aspect of the present disclosure includes the camera of the any of the above aspects, wherein the first at least one sub-pixel comprises the QWP with a fast axis oriented at 45 or 135 degrees relative to the polarizer transmission axis, and the second at least one sub-pixel comprises the HWP with a fast axis oriented at 22.5, 45, 67.5, 112.5, 135, or 157.5 degrees relative to the polarizer transmission axis.

A thirteenth aspect of the present disclosure includes a component stack for a polarization camera including: a pixelated waveplate positioned to receive light, the pixelated waveplate comprising an array of super-pixels comprising birefringent structures, wherein each super-pixel comprises: a first at least one sub-pixel comprising a QWP and a second at least one sub-pixel comprising a HWP; a non-pixelated polarizer to receive light from the pixelated waveplate; and a color filter wherein the QWP and the HWP are achromatic within a predetermined bandwidth of the color filter.

A fourteenth aspect of the present disclosure includes a component stack of the any of the above aspects, wherein the non-pixelated polarizer comprises a uniformly patterned polarizer.

A fifteenth aspect of the present disclosure a component stack of the any of the above aspects, wherein the pixelated waveplate comprises a metamaterial.

A sixteenth aspect of the present disclosure a component stack of the any of the above aspects, further including a uniform waveplate positioned such that the pixelated waveplate receives light from the uniform waveplate, wherein the uniform waveplate applies a uniform birefringence to the light received by the pixelated waveplate.

A seventeenth aspect of the present disclosure a component stack of the any of the above aspects, wherein the each super-pixel further comprises a third at least one sub-pixel comprising a zero-wave plate that has no net birefringence such that incident polarization states of the received light is not altered.

An eighteenth aspect of the present disclosure includes a pixelated waveplate for a component stack for a polarization camera, comprising: an array of super-pixels, wherein each super-pixel comprises: a first at least one sub-pixel comprising a QWP and a second at least one sub-pixel comprising a HW.

An nineteenth aspect of the present disclosure includes a pixelated waveplate of any of the above aspects, wherein the QWP is configured to impart a π/2 phase difference between linear polarization states perpendicular and parallel to a fast axis of the first at least one sub-pixel, the HWP is configured to impart a π phase difference between linear polarization states perpendicular and parallel to a fast axis of the second at least one sub-pixel, the QWP includes a fast axis oriented at 45 or 135 degrees relative to the polarizer transmission axis and a pixelated waveplate of any of the above aspects, and the HWP includes a fast axis oriented at 22.5, 45, 67.5, 112.5, 135, or 157.5 degrees relative to the polarizer transmission axis.

A twentieth aspect of the present disclosure includes a pixelated waveplate of any of the above aspects, wherein each super-pixel further comprises a third at least one sub-pixel comprising a zero-wave plate that has no net birefringence such that incident polarization states of the received light is not altered.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
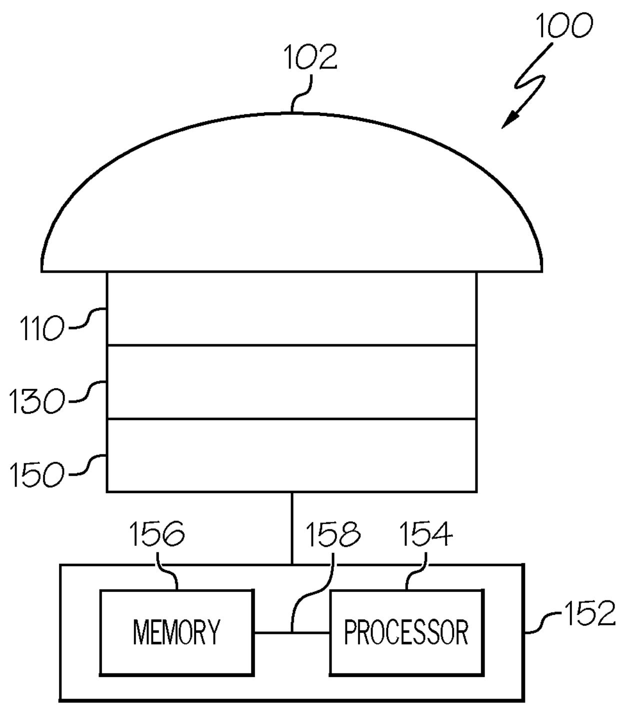
FIG. 1 schematically depicts a component stack for a polarization camera, according to one or more embodiments described herein.

Reference will now be made in detail to embodiments of systems and methods for imaging light with a pixelated metasurface waveplate and a uniformly pixilated polarizer. In embodiments a component stack for a polarization camera includes a microlens that receives light from a scene. The received light can be focused through the microlens to a pixelated waveplate positioned to receive light passing through the microlens. The waveplate includes an array of optical super-pixels comprising birefringent structures. Each of the super-pixels includes a plurality of sub-pixels. The sub-pixels include structures having different phase retardations to manipulate incident polarization states by polarization conversion and rotation, and the uniform polarizer differentiates polarizations by distinct intensity transmittances. Such sub-pixels can be described as having different waveplate structures or waveplates. For example, each of the super-pixels includes at least one sub-pixel of each of a QWP and a HWP and may further include at least one sub-pixel of a ZWP. This may allow the waveplate to convert select linear polarizations into circular polarizations, select circular polarizations into linear polarizations, or the like. Moreover, the waveplate can include a metastructure, with structural birefringence formed in the waveplate to have appropriate fast axis orientations, wherein the fast axis of a waveplate is the axis along which a linear polarization state gets imparted the smallest phase retardation, among all linear polarization states, by the waveplate. Further, light from the waveplate is received by a polarizer that includes an array of identical sub-pixels, that is, a uniform and non-pixelated polarizer. A photo detector detects light received from the polarizer.

Polarization imaging can reveal the surface features, shading, mechanical stress, optical activity, or other information. Polarization imaging is used in many fields for mechanical characterization, biomedical imaging, machine vision, quantum communications, and remote sensing.

As such, embodiments discloses systems and methods for a full-Stokes image sensor that includes one uniform, non-pixelated polarizer. The polarizer includes a simplified structure in comparison to traditional systems, which can reduce fabrication complexity, cost, and errors, while at the same time allowing for high-performance in a polarization camera. For instance, in some traditional polarization cameras (including polarization cameras with QWPs), pixelated polarizers are used for imaging of linear polarizations. These systems typically have low performance or high cost due at least in part to the complexity of manufacturing and particular alignment requirements.

As used herein, the term “about” means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term “about” is used in describing a value or an end-point of a range, the specific value or end-point referred to is included. Whether or not a numerical value or end-point of a range in the specification recites “about,” two embodiments are described: one modified by “about,” and one not modified by “about.” It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation. Further, as used herein, the singular forms “a,” “an” and “the” include plural referents unless the context clearly dictates otherwise. Thus, for example, reference to “a” component includes aspects having two or more such components, unless the context clearly indicates otherwise.

Referring now to FIG. 1, schematically depicted is a component stack 100 for a polarization camera. The component stack 100 primarily includes a lens or microlens array 102, a waveplate 110, a polarizer 130, and a detector 150. It is noted that the components of the component stack 100 may be appropriately spaced apart from each other, included within a housing, disposed in a vacuum, or the like. As described herein, the component stack 100 may obtain polarized image information (e.g., a degree-of-polarization image p and a polarization phase image @). In some examples, the component stack 100 can include other components, such as a color filter to obtain color image information as well as polarized image information. Color filters may be disposed at any appropriate location. Such locations may include between at least one of the microlens array 102 and the pixelated waveplate 110, the pixelated waveplate 110 and the non-pixelated polarizer 130, or the non-pixelated polarizer 130 and the detector 150.

The microlens array 102 can receive light from a scene. The light includes electromagnetic radiation throughout the electromagnetic spectrum. The light passes through the microlens array 102 to the waveplate 110. The waveplate 110 manipulates incident polarization states of the received light by polarization conversion and rotation with preferential transmission of one linear polarization. This transformed light is then received by the polarizer 130, which differentiates polarizations by distinct intensity transmittances. It is noted that the component stack 100 can be utilized for electromagnetic waves regardless of the frequency, including ultraviolet, visible, infrared, and microwave. The intensity of light in a given polarization is detected by the detector 150. It is further noted that embodiments may not include a microlens array 102, as such microlens array 102 may be optional.

Detector 150 can include a sensor comprising photodetector pixels (e.g., photodiodes, phototransistors, or avalanche diodes) that can receive, detect, quantify, convert, or otherwise sense parameters of received light. In embodiments, the detector 150 can receive color band signals, near infrared (IR) band signals. Detector 150 can include a charge-coupled device (CCD) sensor, complementary metal-oxide-semiconductor (CMOS) sensor, or other appropriate photosensor devices. In some examples, the detector 150 can include a color filter. In other examples, a separate color filter can be provided between the polarizer 130 and the detector 150. The color filter can include one or more R, G, and B filter elements. It is noted that the ZWP, QWP, and HWP sub-pixels of the waveplate 110 can be achromatic within a predetermined bandwidth of the color filter.

Moreover, the detector 150 can be coupled to a processing device, such as computing device 152. Computing device 152 can include any device or combination of components comprising a processor 154 and non-transitory computer readable memory 156. The processor 154 may be any device capable of executing the machine-readable instruction set stored in the non-transitory computer readable memory 156. Accordingly, the processor 154 may be an electric controller, an integrated circuit, a microchip, a computer, or any other computing device. The processor 154 is communicatively coupled to the other components of a polarization camera by the communication bus 158. Accordingly, the communication bus 158 may communicatively couple any number of processors 154 with one another, and allow the components coupled to the communication bus 158 to operate in a distributed computing environment. It is further noted that the processor 154 may comprise a single processor, multiple processors, or a system of processors.

The non-transitory computer readable memory 156 may comprise RAM, ROM, flash memories, hard drives, or any non-transitory memory device capable of storing machine-readable instructions such that the machine-readable instructions can be accessed and executed by the processor 154. The machine-readable instruction set may comprise logic or algorithm(s) written in any programming language of any generation (e.g., 1GL, 2GL, 3GL, 4GL, or 5GL) such as, for example, machine language that may be directly executed by the processor 154, or assembly language, object-oriented programming (OOP), scripting languages, microcode, etc., that may be compiled or assembled into machine readable instructions and stored in the non-transitory computer readable memory 156. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. It is noted that the non-transitory computer readable memory 156 may include one or more devices, memory modules, or the like.

Detector 150 can include photosensor devices, such as CCDs and CMOS devices, are sensitive to all polarization states. Therefore, for computing device 152 to receive an image with polarization information, light must be filtered or split into a representative set of constituent polarization states by the component stack 100. Such states can then be sensed by detector 150 and recorded, such as by computing device 152. The polarization state of light in a particular region can be defined by its Stokes parameters, which represent time-averaged projections into a standardized set of polarization states. Stokes parameters are can be used as the basis states for polarization imaging. It is noted that in some embodiments, different sets of polarization states can be utilized. The waveplate 110 and polarizer can filter or split light as described herein.

The waveplate 110 can comprise an array of optical super-pixels. Each super-pixel comprises a plurality of sub-pixels. The sub-pixels can include portions of the waveplate 110 of a predetermined size and construction. Accordingly, the waveplate 110 may include an array of structures having different birefringent structures formed in the waveplate 110. The waveplate 110 may include or otherwise be made of metasurfaces or metamaterials. The metamaterials can include artificial materials with their optical properties determined by patterned sub-wavelength structures. In contrast to natural materials whose refractive indices are determined by atomic and molecular responses to external electromagnetic waves, metamaterials' effective refractive indices are locally defined by high-index sub-wavelength structures, which allow spatial control of the transmissive or reflective phase in a predetermined manner. In embodiments, the waveplate 110 can comprise any appropriate metamaterial working in the visible to infrared wavebands, such as metamaterials including metals (e.g., gold, silver, and aluminum) and dielectrics (e.g., silicon, titanium dioxide, and silicon nitride). It is noted that the waveplate 110 may be manufactured with predetermined thicknesses via lithography and nanofabrication techniques.

Still referring to FIG. 1, the waveplate 110 may be pixelated into super-pixels, where each super-pixel includes a plurality of sub-pixels (e.g., 4 sub-pixels, 6 sub-pixels, etc.). Each sub-pixel of the waveplate 110 may be configured as one of a ZWP, QWP, or a HWP. A ZWP includes a metamaterial structure that does not change the incident polarization states. A QWP includes a metamaterial structure that converts incident circularly polarized light to linear polarizations. A HWP includes a metamaterial structure that rotates linear polarizations. After passing sub-pixels of the waveplate 110, light with different polarizations can be analyzed.

In embodiments, ZWPs, QWPs, and HWPs can be realized by selection of a type of metamaterial. The material includes an array of posts without four-fold rotational symmetry (e.g., rectangular or elliptical). The geometry of each post is designed to impart a phase difference of 0 for ZWPs, $\pi/2$ for QWPs, or $\pi$ for HWPs between linear polarizations perpendicular and parallel to the fast axis. That is, posts are longer in one direction in the image plane. The sub-pixel array of the waveplate 110 can be rotated to realize a desired fast axis orientations. Furthermore, meta-atoms with more complex shapes can be designed for specific application requirements. Sub-pixels with ZWPs can be implemented with no structure or with structures that do not introduce birefringence, e.g., an array of structures with four-fold rotational symmetry (e.g., square or circular). In some embodiments, a structure that does not introduce birefringence may be particularly useful for fabrication and/or assembly since it would allow the waveplate 110 to include structures to be made with a uniform thickness.

Figure 2:
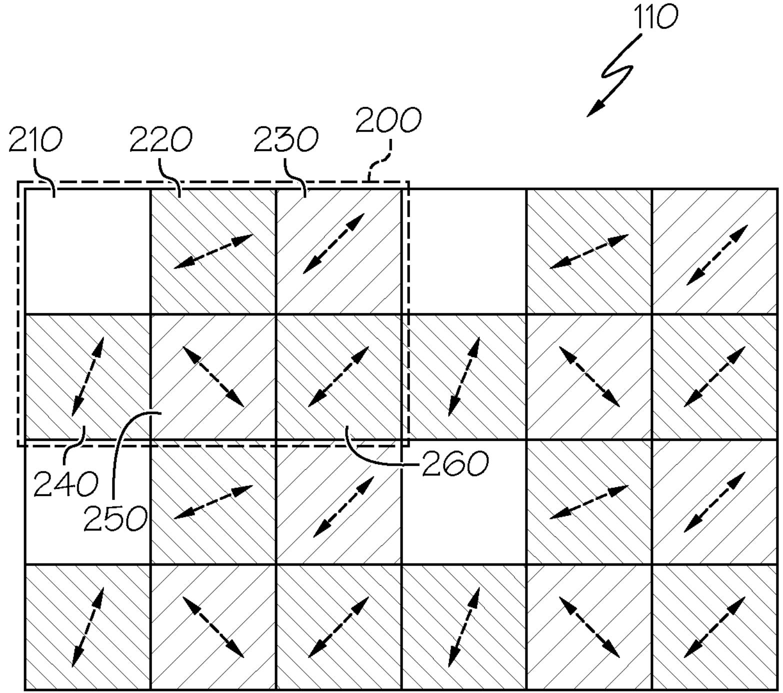
FIG. 2 schematically depicts a portion of a waveplate including an array of super-pixels, according to one or more embodiments described herein.

Turning now to FIG. 2, with reference to FIG. 1, there is a schematic of at least a portion of the waveplate 110. Waveplate 110 can comprise an array of super-pixels, including super-pixel 200. Super-pixel 200 may likewise include an array of sub-pixels, such as sub-pixels 210, 220, 230, 240, 250, and 260. It is noted that embodiments of waveplate 110 may include arrays of different numbers of super-pixels. While FIG. 2 illustrates super-pixel 200 with six sub-pixels, other examples can include different numbers of sub-pixels, such as four sub-pixels (FIG. 10), or other appropriate numbers of pixels.

In embodiments, sub-pixel 210 may comprise a ZWP. Sub-pixels 220, 240, and 260 may comprise HWPs. Sub-pixels 230 and 250 may comprise QWPs. It is noted that the placement and arrangement of each sub-pixel 210, 220, 230, 240, 250, and 260 may be varied in different embodiments based on an appropriate application. In FIG. 2, the orientation of the fast axis of each of the QWP sub-pixels 230 and 250 and the HWP sub-pixels 220, 240, and 260 are indicated by arrows.

Figure 3:
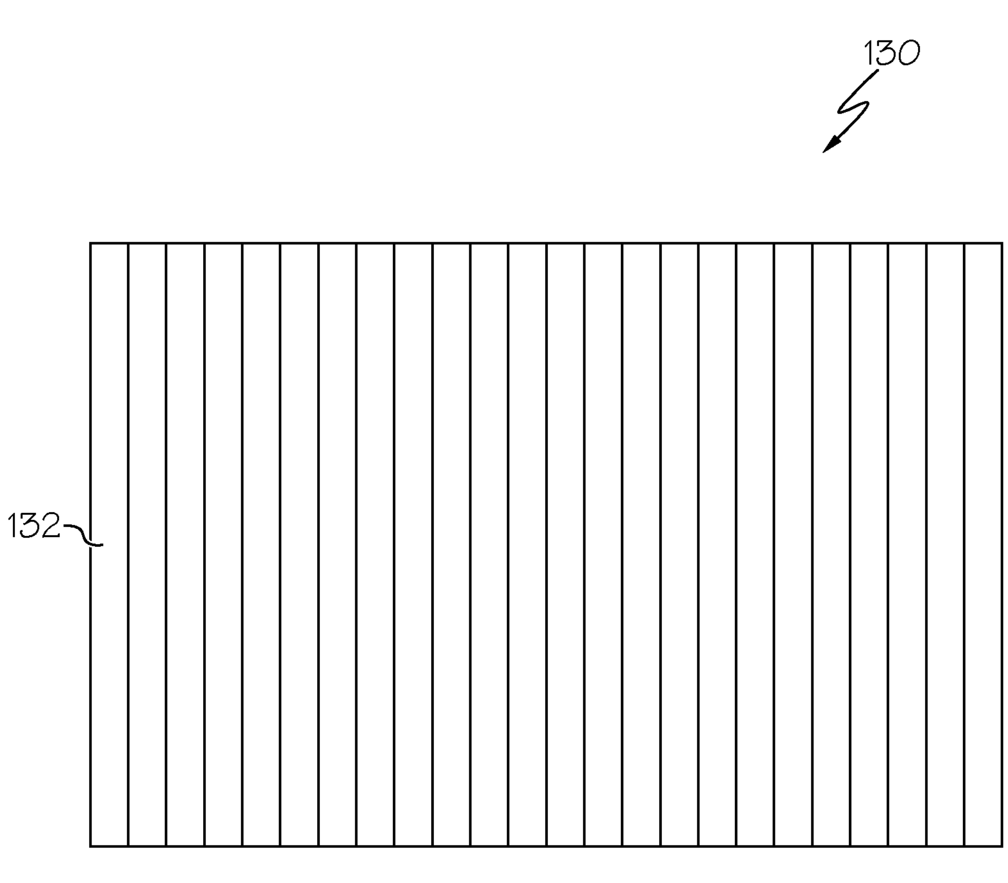
FIG. 3 schematically depicts a non-pixelated polarizer, according to one or more embodiments described herein.

Referring now to FIG. 3, there is a schematic of at least a portion of the polarizer 130 comprising a uniform pattern 132. The polarizer 130 can include absorptive polarizers (e.g., such as those used for division-of-focal-plane cameras). Absorptive polarizers preferentially transmit certain linear polarization states, on top of sensor pixels for imaging of four different linear polarizations at visible and near-infrared wavelengths.

In embodiments, the polarizer 130 includes a uniform pattern 132, such that the polarizer 130 may be considered non-pixelated or otherwise uniform. As described herein, the waveplate 110 includes an array of super-pixels 200, with an array of sub-pixel 210, 220, 230, 240, 250, and 260, wherein the sub-pixel 210, 220, 230, 240, 250, and 260 have different phase retardations to manipulate incident polarization states by polarization conversion and rotation. The polarizer 130 differentiates polarizations by distinct intensity transmittances.

Still referring to FIG. 3, the polarizer 130 can have a simplified pattern 132 relative to traditional polarizers. This may allow the polarizer 130, for example, to be produced in sheets which can be cut to size. It is noted that the waveplate 110 may manipulate polarization in such a way that the enables reduced need for overly complex and difficult to manufacture pixilated polarizers, which also require complicated and expensive fabrication and alignment processes. As an example, traditional pixelated metal wire grids use either masked photolithography or multiple steps of laser interference lithography for patterning. The polarizer 130 can include a non-pixelated metal wire grids patterned with pattern 132 in a large area with one application of maskless laser interference lithography. In other embodiments, the polarizer 130 can include liquid crystal polymers and glass-based polarizers (e.g., CORNING POLARCOR) that do not require lithographical patterning. Moreover, traditional polarizers require precise registration or alignment between assembly layers due to the different orientations of such pixelated polarizers. Polarizer 130 is generally uniform and/or includes a uniform pattern 132 such that polarizer 130 does not require difficult, timely, and costly registration and alignment. Accordingly, polarizer 130 can further allow for faster and less costly manufacturing of the component stack 100. It is noted that embodiments may allow for selection of a set of unconventional polarization projections that are selected for different applications. Moreover, embodiments described herein may reduce or remove the need for some traditional components, such as extra switches, optics, and/or sensors in comparison with traditional polarization imaging techniques that are based on division of time, amplitude, aperture, and focal plane.

Figures 4, 5:
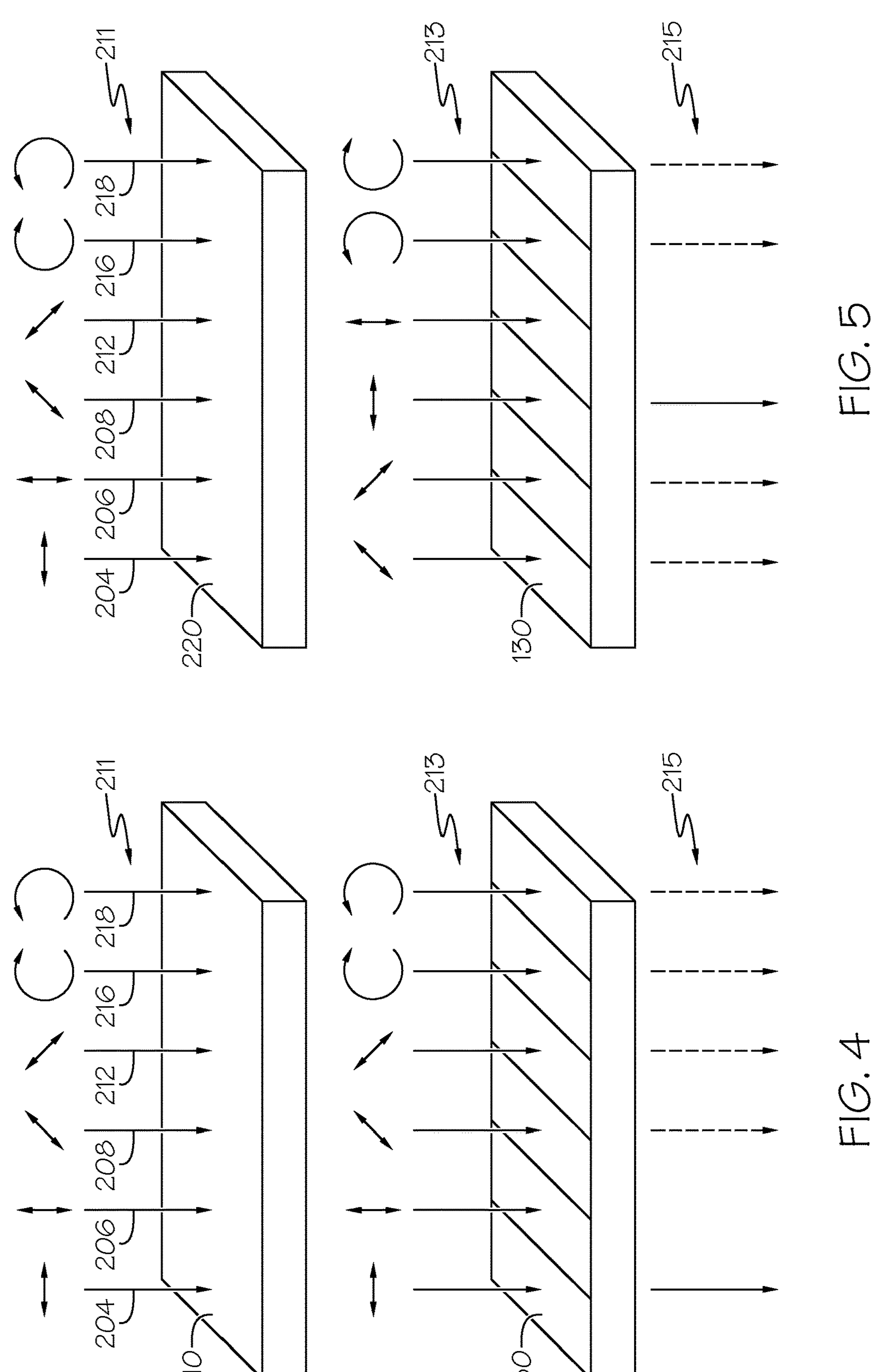
FIG. 4 schematically depicts a ZWP sub-pixel of a pixelated waveplate, according to one or more embodiments described herein.
FIG. 5 schematically depicts a depicts a HWP sub-pixel of a pixelated waveplate with a fast axis orientation of 22.5 degrees, according to one or more embodiments described herein.

Referring now to FIG. 4, there is a schematic of sub-pixel 210 that is a ZWP. The sub-pixel 210 receives light 211, which can include light beams 204, 206, 208, 212, 216, and 218. The polarization of each of the light beams 204, 206, 208, 212, 216, and 218 is indicated by double headed or circular arrows. For instance, light beam 204 includes a linear and horizontal polarization. Light beam 206 includes a linear and vertical polarization. Light beam 208 and light beam 212 respectively include 45-degree and 135-degree linear polarizations. Light beams 216 and 218 respectively include right circular polarization and left circular polarization.

In embodiments, light passes through the sub-pixel 210 with polarization states unaffected, as shown at light 213. The light 213 then passes through the polarizer 130. The polarizer 130 fully blocks the 90-degree (vertical linear) light beam 206, passes the 0-degree (horizontal linear) light beam 204 at nearly full intensity, and transmits a reduced intensity (e.g., about half) of light beams having other polarization states (45-degree, 135-degree, right circular, and left circular) as shown at light 215.

Figures 6, 7:
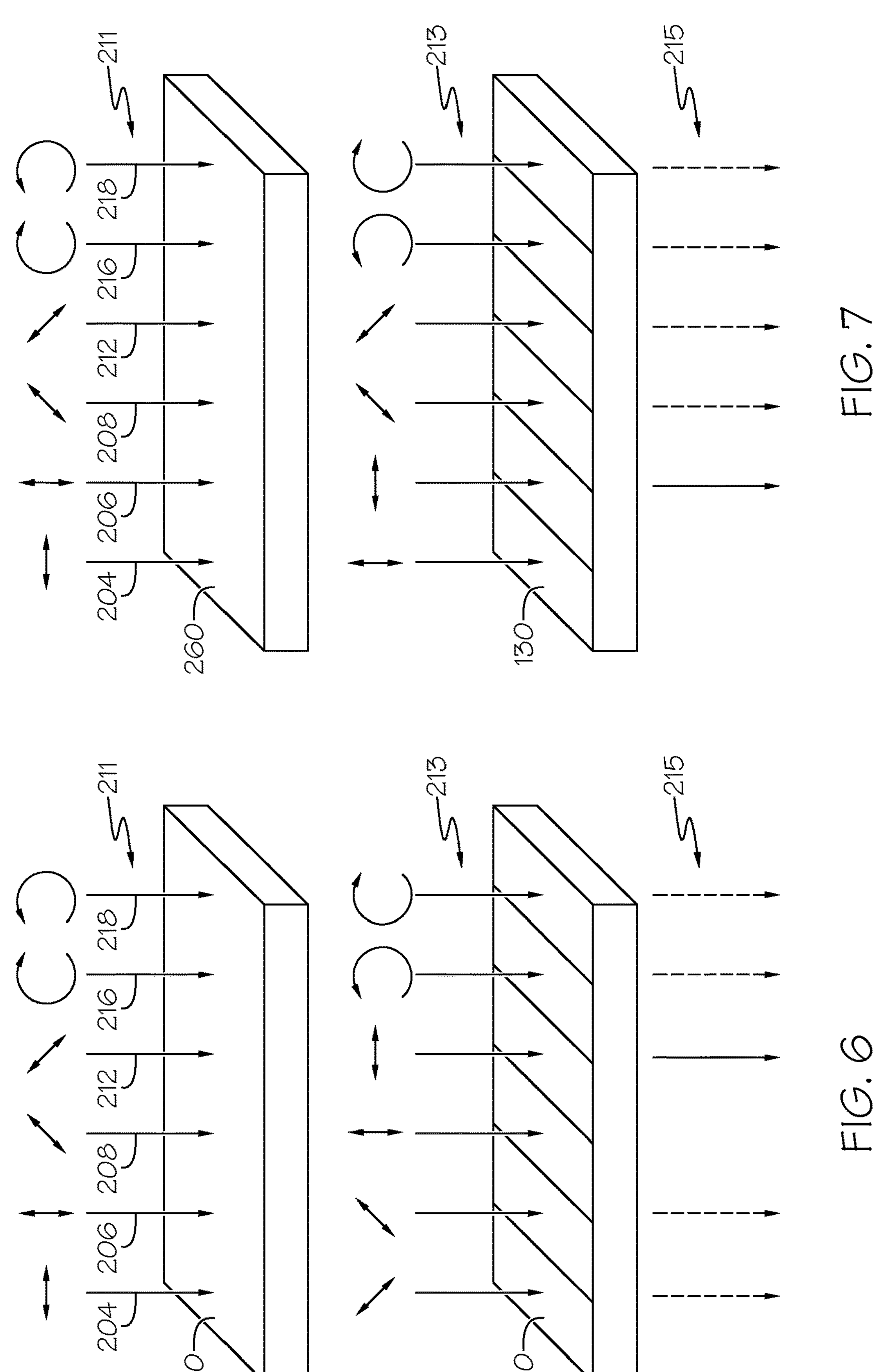
FIG. 6 schematically depicts a HWP sub-pixel of a pixelated waveplate with a fast axis orientation of 67.5 degrees, according to one or more embodiments described herein.
FIG. 7 schematically depicts a HWP sub-pixel of a pixelated waveplate with a fast axis orientation of 45 degrees, according to one or more embodiments described herein.

Turning now to FIGS. 5-7, there are schematics of sub-pixels 220, 240, and 260 which include HWPs. The sub-pixel 220 includes a fast axis orientation of 22.5 degrees, the sub-pixel 240 includes a fast axis orientation of 67.5 degrees, the sub-pixel 260 includes a fast axis orientation of 45 degrees. As described herein, the different fast axis orientations may allow for manipulation of select polarization states of light 211 such as through rotation of incident linear polarizations. The light 213 (e.g., light 211 after passing through respective sub-pixels) can be received by the polarizer 130, which may then block select light beams having certain polarization states, allow partial or reduced transmission of select light beams having certain polarization states, and/or allow for full or generally full transmission of select light beams having certain polarization states.

In FIG. 5, the sub-pixel 220 imparts a $\pi$ phase difference between electric field components oriented at 112.5 degrees and 22.5 degrees. Sub-pixel 220 rotates polarization states of light beams 204 and 206 (e.g., horizontal and vertical linear polarizations) by 45 degrees. Sub-pixel 220 further rotates polarization states of light beams 208 and 212 (45-degree and 135-degree polarizations) by −45 degrees, and reverses the polarization states of light beams 216 and 218 (right and left circular polarizations), as shown at 213. The light 213 is received by the polarizer 130, which about fully transmits the intensity of the light beam 208 having a 45-degree polarization, rejects the light beam 212 having a 135-degree polarization, and transmits a reduced (e.g., about half) of the intensity of other light beams 204, 206, 216, and 218 having other polarization states as indicated herein.

As shown in FIG. 6, the sub-pixel 240 does the opposite operation to linear polarization states in comparison with sub-pixel 220, while similarly reversing circular polarization states. Sub-pixel 240 rotates polarization states of light beams 204 and 206 (e.g., horizontal and vertical linear polarizations) by −45 degrees. Sub-pixel 240 further rotates polarization states of light beams 208 and 212 (45-degree and 135-degree polarizations) by 45 degrees, and reverses the polarization states of light beams 216 and 218 (right and left circular polarizations), as shown at 213. The light 213 is received by the polarizer 130, which about fully transmits the intensity of the light beam 212 having a 135-degree polarization, rejects the light beam 208 having a 45-degree polarization, and transmits a reduced (e.g., about half) of the intensity of other light beams 204, 206, 216, and 218 having other polarization states as indicated herein.

In FIG. 7, the sub-pixel 260 rotates horizontal and vertical linear polarization states by 90 degrees, does not alter 45 degree or 135 degree polarizations, while similarly reversing circular polarization states. For instance, Sub-pixel 260 rotates polarization states of light beams 204 and 206 (e.g., horizontal and vertical linear polarizations) by 90 degrees. Sub-pixel 260 does not rotate polarization states of light beams 208 and 212 (45-degree and 135-degree polarizations), and reverses the polarization states of light beams 216 and 218 (right and left circular polarizations), as shown at 213. The light 213 is received by the polarizer 130, which about fully transmits the intensity of the light beam 206 having a linear and vertical polarization, rejects the light beam 204 having a linear and horizontal polarization, and transmits a reduced (e.g., about half) of the intensity of other light beams 208, 212, 216, and 218 having other polarization states as indicated herein.

Figures 8, 9:
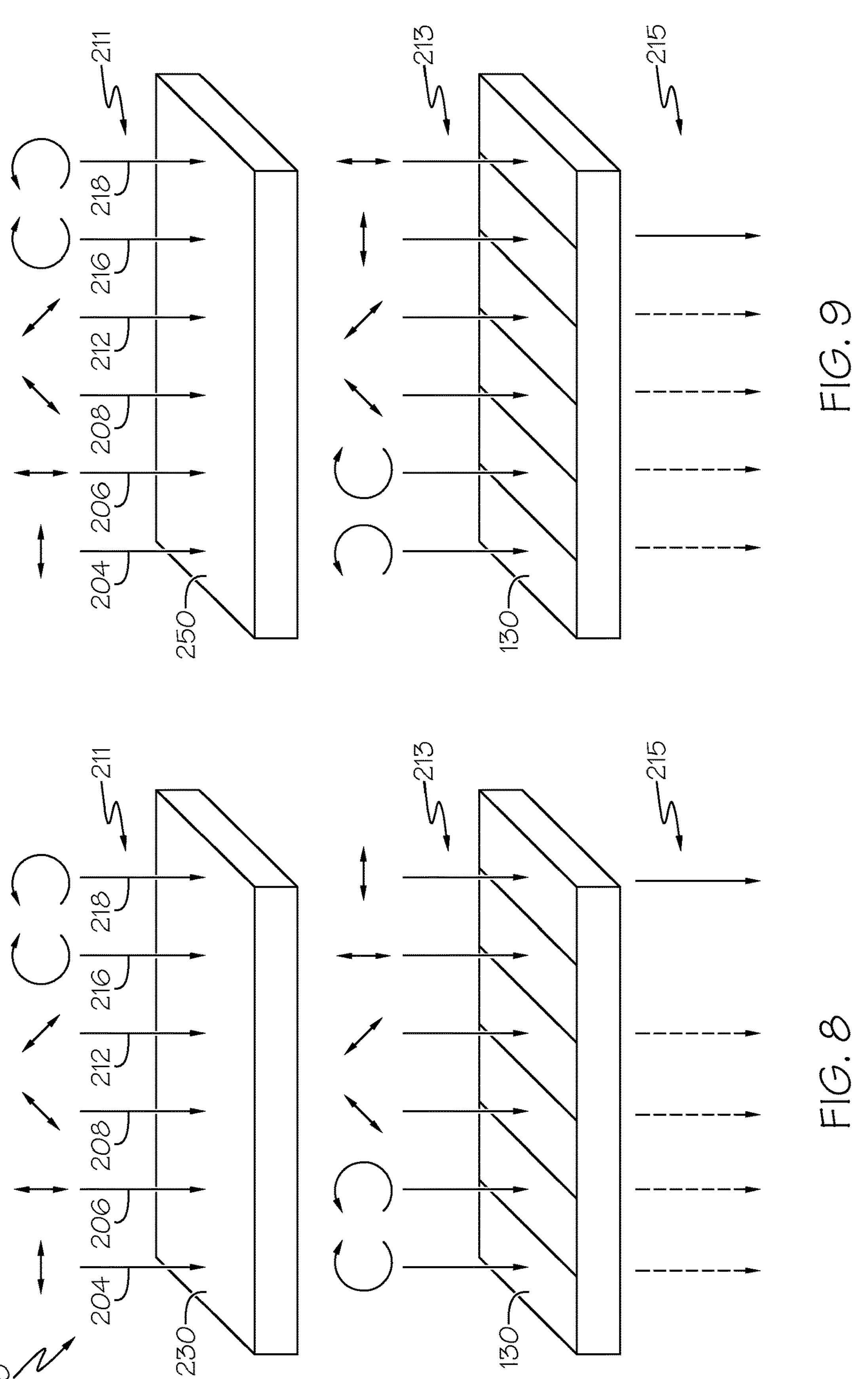
FIG. 8 schematically depicts a QWP sub-pixel of a pixelated waveplate with a fast axis orientation of 45 degrees, according to one or more embodiments described herein.
FIG. 9 schematically depicts a QWP sub-pixel of a pixelated waveplate with a fast axis orientation of 135 degrees, according to one or more embodiments described herein.

Referring now to FIGS. 8-9, there are schematics of sub-pixels 230 and 250, which include QWPs. The sub-pixel 230 includes a fast axis orientation of 45 degrees and the sub-pixel 250 includes a fast axis orientation of 135 degrees.

The QWP sub-pixels 230 and 250 are configured to impart a π/2 phase difference between linear polarization states perpendicular and parallel to a fast axis of the waveplate sub-pixel. In embodiments, sub-pixels 230 and 250 convert circular polarization states to certain linear polarization states (depending on the fast axis orientations) and in turn converts certain linear polarization states to circular polarization states. As such, the polarizer 130 can analyze incident circular polarizations after they are converted to linear polarizations by the QWP sub-pixels 230 and 250.

As described herein, the different fast axis orientations may allow for manipulation of select polarization states of light 211 such as through rotation of incident linear polarizations. The light 213 (e.g., light 211 after passing through respective sub-pixels) can be received by the polarizer 130, which may then block select light beams having certain polarization states, allow partial or reduced transmission of select light beams having certain polarization states, and/or allow for full or generally full transmission of select light beams having certain polarization states.

Turning to FIG. 8, the sub-pixel 230 converts horizontal and vertical linear polarization states to circular polarization, does not alter 45 degree or 135 degree polarizations, while converting circular polarization states to linear polarization states. For instance, Sub-pixel 230 converts polarization states of light beams 204 and 206 (e.g., horizontal and vertical linear polarizations) respectively to right circular and left circular polarization states. Sub-pixel 230 does not alter polarization states of light beams 208 and 212 (45-degree and 135-degree polarizations), and converts the polarization states of light beams 216 and 218 (right and left circular polarizations) respectively to vertical and horizontal linear polarization states, as shown at 213. The light 213 is received by the polarizer 130, which about fully transmits the intensity of the light beam 218 having a left circular polarization, rejects the light beam 216 having a right circular polarization, and transmits a reduced (e.g., about half) of the intensity of other light beams 204, 206, 208, and 212 having other polarization states as indicated herein.

As shown in FIG. 9, the sub-pixel 250 converts horizontal and vertical linear polarization states to circular polarization having opposite directions in comparison to sub-pixel 230, does not alter 45 degree or 135 degree polarizations, while converting circular polarization states to linear polarization states having opposite directions in comparison to sub-pixel 230. For instance, Sub-pixel 250 converts polarization states of light beams 204 and 206 (e.g., horizontal and vertical linear polarizations) respectively to left circular and right circular polarization states. Sub-pixel 250 does not alter polarization states of light beams 208 and 212 (45-degree and 135-degree polarizations), and converts the polarization states of light beams 216 and 218 (right and left circular polarizations) respectively to horizontal and vertical linear polarization states, as shown at 213. The light 213 is received by the polarizer 130, which about fully transmits the intensity of the light beam 216 having a right circular polarization, rejects the light beam 218 having a left circular polarization, and transmits a reduced (e.g., about half) of the intensity of other light beams 204, 206, 208, and 212 having other polarization states as indicated herein.

Referring again to FIG. 1, with reference to FIGS. 2-9, the detector 150 can receive input from the polarizer 130, such as intensity of light beams having certain polarization states. The detector 150 can record, store, transmit or otherwise processes intensities of received light at each sub-pixel of the waveplate 110. The computing device 152 can receive the intensities and may process the image data in an appropriate manner. It is noted that computing device 152 can be configured for any appropriate application, such as structural analysis, composition analysis, or the like.

In embodiments, the non-transitory computer readable memory 156 can include instructions that, when executed by the processor 154, cause the processor 154 to perform actions. For simplicity, computing device 152 is referred to herein as performing actions. The computing device 152 can be configured for particular super-pixel or sub-pixel arrangements (e.g., number of pixels, placement of ZWP, QWP, HWP sub-pixels, etc.). Thus, while embodiments may refer to computing device 152 processing image data from a particular embodiment, it is noted that computing device 152 can process image data of various other embodiments.

In an example, the waveplate 110 can include super-pixel 200 (FIG. 2) having six sub-pixels 210, 220, 230, 240, 250, and 260. As described herein the sub-pixel 210 can include a ZWP, the sub-pixel 220 can include a HWP with fast axis oriented at 22.5 degrees relative to the polarizer transmission axis, the sub-pixel 230 can include a QWP fast axis oriented at 45 degrees relative to the polarizer transmission axis, the sub-pixel 240 can include a HWP with fast axis oriented at 67.5 degrees relative to the polarizer transmission axis, the sub-pixel 250 can include a QWP with fast axis oriented at 135 degrees relative to the polarizer transmission axis, and the sub-pixel 260 can include a HWP with fast axis oriented at 45 or 135 degrees relative to the polarizer transmission axis. The computing device 152 can be configured to determine Stokes parameters for each super-pixel of an array of super-pixels according to one or more equations.

In an embodiment, the computing device 152 can compute the Stokes parameters according to the following equations:

$$S_0 = I_A + I_F \quad \text{Equation 1}$$

$$S_1 = I_A - I_F \quad \text{Equation 2}$$

$$S_2 = I_B - I_D \quad \text{Equation 3}$$

$$S_3 = I_C - I_E \quad \text{Equation 4}$$

wherein $I_A$ comprises an intensity at sub-pixel 210, $I_B$ comprises an intensity at sub-pixel 220, $I_C$ comprises an intensity at sub-pixel 230, $I_D$ comprises an intensity at sub-pixel 240, $I_E$ comprises an intensity sub-pixel 250, $I_F$ comprises an intensity at sub-pixel 260, $S_0$ comprises a Stokes parameter for a first polarization coordinate, $S_2$ comprises a Stokes parameter for a second polarization coordinate, $S_2$ comprises a Stokes parameter for a third polarization coordinate, and $S_3$ is a Stokes parameter for a fourth polarization coordinate. Accordingly, computing device 152 may utilize the Stokes parameters to analyze polarization information according to a desired application.

In another example, computing device 152 can compute the Stokes parameters of other embodiments of component stack 100. Such embodiments may include different waveplate 110 configurations, inclusion of color filters, or the like.

Figure 10:
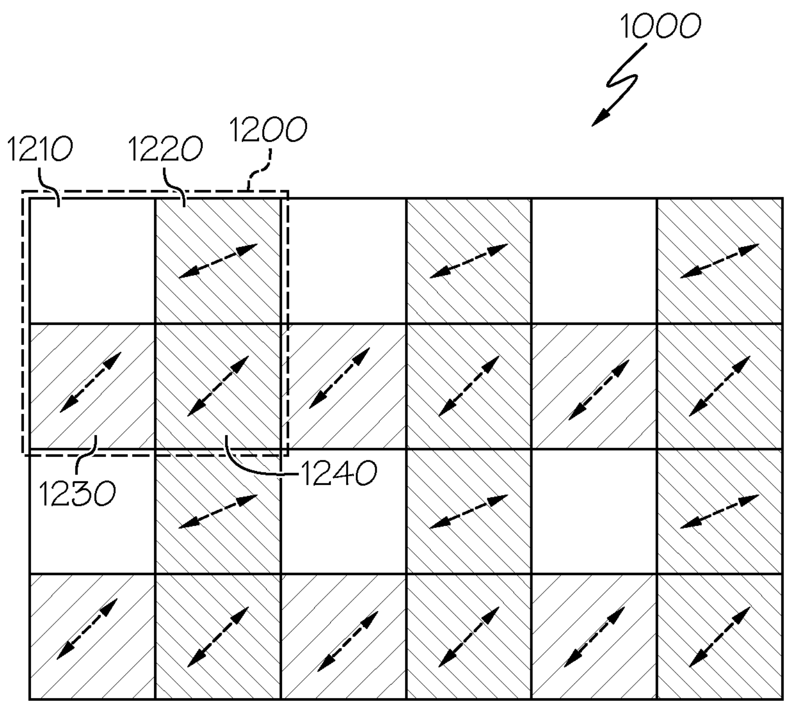
FIG. 10 schematically depicts a portion of a waveplate including an array of super-pixels having four sub-pixels, according to one or more embodiments described herein.

Referring now to FIG. 10, with reference to FIG. 1, the waveplate 110 can include super-pixel 1200 comprising four sub-pixels 1210, 1220, 1230, and 1240. Sub-pixel 210 may comprise a ZWP. The sub-pixel 1220 can include a HWP with fast axis oriented at 22.5 degrees relative to the polarizer transmission axis, the sub-pixel 1230 can include a QWP fast axis oriented at 45 degrees relative to the polarizer transmission axis, the sub-pixel 1240 can include a HWP with fast axis oriented at 45 or 135 degrees relative to the polarizer transmission axis. The computing device 152 can be configured to determine Stokes parameters for each super-pixel of an array of super-pixels according to one or more equations.

In an embodiment, the computing device 152 can compute the Stokes parameters according to the following equations:

$$S_0 = I_{A'} + I_{D'} \quad \text{Equation 5}$$

$$S_1 = I_{A'} - I_{D'} \quad \text{Equation 6}$$

$$S_2 = 2I_{B'} - I_{A'} - I_{D'} \quad \text{Equation 7}$$

$$S_3 = 2I_{C'} - I_{A'} - I_{D'} \quad \text{Equation 8}$$

wherein $I_{A'}$ comprises an intensity at sub-pixel 1210, $I_{C'}$ comprises an intensity at sub-pixel 1230, $I_{B'}$ comprises an intensity at sub-pixel 1220, $I_{D'}$ comprises an intensity at sub-pixel 1240. Accordingly, computing device 152 may utilize the Stokes parameters to analyze polarization information according to a desired application.

In embodiments, the computing device 152 may allow for processing and acquisition of information of a surface orientation on objects, identification of differences between transparent surfaces and non-transparent surfaces or the like. In examples, the computing device may be configured for automated processes, security systems, pharmaceutical applications, composition, analysis, or the like. The computing device 152 can capture polarization information in real-time and may process polarization information as appropriate for a particular application. Moreover, while embodiments describe, Stokes parameters, the computing device 152, can utilize a different and possibly incomplete set of polarization states into which the imaging light can be divided.

Figure 11:
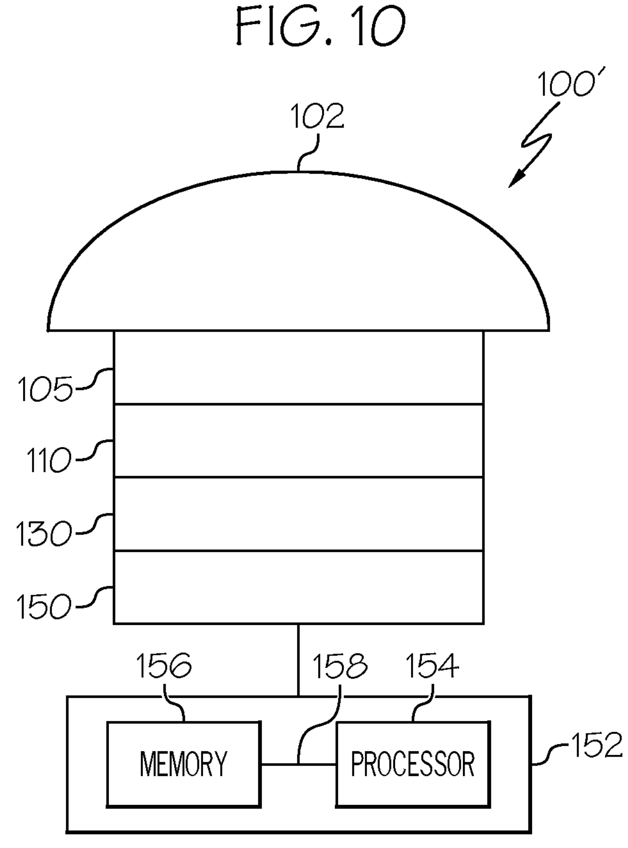
FIG. 11 schematically depicts another embodiment of a component stack for a polarization camera that includes a uniform waveplate, according to one or more embodiments described herein.

Referring now to FIG. 11, a component stack 100' for a polarization camera is schematically depicted. Similar to the component stack 100 of FIG. 1, the component stack 100' includes the lens or microlens array 102, the pixelated waveplate 110, the polarizer 130, and the detector 150. In addition, the component stack 100' includes a uniform waveplate 105 disposed between the microlens array 102 and the pixelated waveplate 110 such that at least some of the light exiting the microlens array 102 passes through the uniform waveplate 105 and such that light exiting the uniform waveplate 105 passes through at least one of the sub-pixels 210, 220, 230, 240, 250, and 260 of the pixelated waveplate 110. In operation, the uniform waveplate 105 applies a uniform birefringence to the light traversing the uniform waveplate 105. Applying a uniform birefringence allows the component stack 100' to be sensitive to more polarization states. By uniformly altering the polarization of light that reaches the pixelated waveplate 110, the detector 150 of the polarization camera receives a different set of polarization states that remain orthogonal on the Poincaré sphere, increasing the tunability of the polarization camera. Moreover, the waveplates corresponding to sub-pixel 210 may be replaced by a waveplate section configured to apply the same birefringence that is applied by the uniform waveplate 105.

In view of the foregoing description, it should be understood that a waveplate of a component stack for a polarization camera is disclosed. Improved polarization detection can be achieved through a waveplate comprising a metamaterial having an array of super-pixels, each super-pixel including sub-pixels comprising at least one ZWP, at least one QWP, and at least one HWP.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

It will be apparent to those skilled in the art that various modifications and variations can be made to the embodiments described herein without departing from the spirit and scope of the claimed subject matter. Thus, itis intended that the specification cover the modifications and variations of the various embodiments described herein provided such modification and variations come within the scope of the appended claims and their equivalents.

What is claimed is:

1. A polarization camera comprising:

a microlens array;

a pixelated waveplate positioned to receive light passing through the microlens array, the pixelated waveplate includes an array of super-pixels comprising birefringent structures, wherein each super-pixel of said pixelated waveplate comprises:

a first at least one sub-pixel comprising a quarter-wave plate, and a second at least one sub-pixel comprising a half-wave plate;

a non-pixelated polarizer positioned to receive light from the pixelated waveplate; and a detector configured to detect light received from the non-pixelated polarizer; and wherein the pixelated waveplate comprises a metamaterial, and the metamaterial comprises high-index sub-wavelength structures defining structural birefringence.

2. The polarization camera of claim 1, further comprising a color filter disposed between at least one of the microlens array and the pixelated waveplate, the pixelated waveplate and the non-pixelated polarizer, or the non-pixelated polarizer and the detector, and wherein the quarter-wave plate and the half-wave plate are achromatic within a predetermined bandwidth of the color filter.

3. A polarization camera comprising:

a microlens array;

a pixelated waveplate positioned to receive light passing through the microlens array, the pixelated waveplate includes an array of super-pixels comprising birefringent structures, wherein each super-pixel comprises:

a first at least one sub-pixel comprising a quarter-wave plate, and a second at least one sub-pixel comprising a half-wave plate;

a non-pixelated polarizer to receive light from the pixelated waveplate; and a detector configured to detect light received from the non-pixelated polarizer;

and further comprising a uniform waveplate disposed between the microlens array and the pixelated waveplate.

4. The polarization camera of claim 3, wherein the pixelated waveplate comprises a metamaterial.

5. The polarization camera of claim 3, wherein the uniform waveplate applies a uniform birefringence to light traversing the uniform waveplate.

6. The polarization camera of claim 3, wherein the non-pixelated polarizer comprises a non-pixelated metal grid.

7. The polarization camera of claim 3, further comprising a color filter disposed between at least one of the microlens array and the pixelated waveplate, the pixelated waveplate and the non-pixelated polarizer, or the non-pixelated polarizer and the detector, wherein the quarter-wave plate and the half-wave plate are achromatic within a predetermined bandwidth of the color filter.

8. The polarization camera of claim 3, wherein the first at least one sub-pixel comprises the quarter-wave plate with a fast axis oriented at 45 or 135 degrees relative to the polarizer transmission axis, and the second at least one sub-pixel comprises the half-wave plate with a fast axis oriented at 22.5, 45, 67.5, 112.5, 135, or 157.5 degrees relative to the polarizer transmission axis.

9. A polarization camera comprising:

a microlens array;

a pixelated waveplate positioned to receive light passing through the microlens array, the pixelated waveplate includes an array of super-pixels comprising birefringent structures, wherein each super-pixel comprises:

a first at least one sub-pixel comprising a quarter-wave plate, and a second at least one sub-pixel comprising a half-wave plate;

a non-pixelated polarizer to receive light from the pixelated waveplate; and a detector configured to detect light received from the non-pixelated polarizer;

and, wherein each super-pixel further comprises a third at least one sub-pixel comprising a zero-wave plate that has no net birefringence such that incident polarization states of the received light is not altered.

10. The polarization camera of claim 9, wherein the pixelated waveplate comprises a metamaterial, and the metamaterial comprises high-index sub-wavelength structures defining structural birefringence.

11. The polarization camera of claim 9, wherein each super-pixel comprises four sub-pixels and the waveplate sub-pixels are (1) zero-wave plate, (2) half-wave plate with fast axis oriented at 22.5 degrees relative to the polarizer transmission axis, (3) a quarter-wave plate with fast axis oriented at 45 degrees relative to the polarizer transmission axis, and (4) a half-wave plate with fast axis oriented at 45 or 135 degrees relative to the polarizer transmission axis, further comprising a computing device coupled to the detector, wherein the computing device is configured to determine Stokes parameters for a first super-pixel of the array of super-pixels according to the following equations: $S_0–I_{A'}+I_{D'}$, $S_1–I_{A'}–I_{D'}$, $S_2–2I_{B'}–I_{A'}–I_{D'}$, $S_3–2I_{C'}–I_{A'}–I_{D'}$, wherein $I_{A'}$ comprises an intensity at the third at least one sub-pixel, $I_{C'}$ comprises an intensity at a first of the first at least one sub-pixel, $I_{B'}$ comprises an intensity at a first of the second at least one sub-pixel, $I_{D'}$ comprises an intensity at a second of the second at least one sub-pixel, $S_0$ comprises a Stokes parameter for a first polarization coordinate, $S_1$ comprises a Stokes parameter for a second polarization coordinate, $S_2$ comprises a Stokes parameter for a third polarization coordinate, and $S_3$ is a Stokes parameter for a fourth polarization coordinate.

12. The polarization camera of claim 9, wherein each super-pixel comprises six sub-pixels and the sub-pixel waveplates are (1) zero-wave plate, (2) half-wave plate with fast axis oriented at 22.5 degrees relative to the polarizer transmission axis, (3) a quarter-wave plate with fast axis oriented at 45 degrees relative to the polarizer transmission axis, (4) a half-wave plate with fast axis oriented at 67.5 degrees relative to the polarizer transmission axis, (5) a quarter-wave plate with fast axis oriented at 135 degrees relative to the polarizer transmission axis, and (6) a half-wave plate with fast axis oriented at 45 or 135 degrees relative to the polarizer transmission axis, further comprising a computing device coupled to the detector, wherein the computing device is configured to determine Stokes parameters for a first super-pixel of the array of super-pixels according to the following equations: $S_0=I_A+I_F$, $S_1=I_A–I_F$, $S_2=I_B–I_D$, $S_3=I_C–I_E$, wherein $I_A$ comprises an intensity at the third at least one sub-pixel, $I_B$ comprises an intensity at a first of the first at least one sub-pixel, $I_C$ comprises an intensity at a second of the first at least one sub-pixel, $I_D$ comprises an intensity at a first of the second at least one sub-pixel, $I_E$ comprises an intensity at a second of the second at least one sub-pixel, $I_F$ comprises an intensity at a third of the second at least one sub-pixel, $S_0$ comprises a Stokes parameter for a first polarization coordinate, $S_1$ comprises a Stokes parameter for a second polarization coordinate, $S_2$ comprises a Stokes parameter for a third polarization coordinate, and $S_3$ is a Stokes parameter for a fourth polarization coordinate.

13. The polarization camera of claim 9, wherein the first at least one sub-pixel comprises the quarter-wave plate with a fast axis oriented at 45 or 135 degrees relative to the polarizer transmission axis, and the second at least one sub-pixel comprises the half-wave plate with a fast axis oriented at 22.5, 45, 67.5, 112.5, 135, or 157.5 degrees relative to the polarizer transmission axis.

14. A component stack for a polarization camera comprising:

a pixelated waveplate positioned to receive light, the pixelated waveplate comprising an array of super-pixels comprising birefringent structures, wherein each super-pixel comprises:

a first at least one sub-pixel comprising a quarter-wave plate, and a second at least one sub-pixel comprising a half-wave plate;

a non-pixelated polarizer positioned to receive light from the pixelated waveplate; and a color filter wherein the quarter-wave plate and the half-wave plate are achromatic within a predetermined bandwidth of the color filter, further comprising a uniform waveplate positioned such that the pixelated waveplate receives light from the uniform waveplate, wherein the uniform waveplate applies a uniform birefringence to the light received by the pixelated waveplate.

15. The component stack of claim 14, wherein the non-pixelated polarizer comprises a uniformly patterned polarizer.

16. The component stack of claim 14, wherein the pixelated waveplate comprises a metamaterial.

17. A component stack for a polarization camera comprising:

a pixelated waveplate positioned to receive light, the pixelated waveplate comprising an array of super-pixels comprising birefringent structures, wherein each super-pixel comprises:

a first at least one sub-pixel comprising a quarter-wave plate, and a second at least one sub-pixel comprising a half-wave plate;

a non-pixelated polarizer to receive light from the pixelated waveplate; and a color filter wherein the quarter-wave plate and the half-wave plate are achromatic within a predetermined bandwidth of the color filter, wherein the each super-pixel further comprises a third at least one sub-pixel comprising a zero-wave plate that has no net birefringence such that incident polarization states of the received light is not altered.

18. A pixelated waveplate for a component stack for a polarization camera, comprising:

an array of super-pixels, wherein each super-pixel comprises:

a first at least one sub-pixel comprising a quarter-wave plate, and a second at least one sub-pixel comprising a half-wave plate, wherein each super-pixel further comprises a third at least one sub-pixel comprising a zero-wave plate that has no net birefringence such that incident polarization states of the received light is not altered.

19. The pixelated waveplate of claim 18, wherein:

the quarter-wave plate is configured to impart a $\pi/2$ phase difference between linear polarization states perpendicular and parallel to a fast axis of the first at least one sub-pixel;

the half-wave plate is configured to impart a $\pi$ phase difference between linear polarization states perpendicular and parallel to a fast axis of the second at least one sub-pixel;

the quarter-wave plate includes a fast axis oriented at 45 or 135 degrees relative to the polarizer transmission axis; and the half-wave plate includes a fast axis oriented at 22.5, 45, 67.5, 112.5, 135, or 157.5 degrees relative to the polarizer transmission axis.

* * * * *